United States Patent
Sakuma et al.

(10) Patent No.: US 12,277,595 B2
(45) Date of Patent: Apr. 15, 2025

(54) DYNAMIC VIRTUAL REALITY SHOPPING SHELF INTERFACE

(71) Applicant: INTERNATIONAL BUSINESS MACHINES CORPORATION, Armonk, NY (US)

(72) Inventors: Katsuyuki Sakuma, Fishkill, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 17/551,151

(22) Filed: Dec. 14, 2021

(65) Prior Publication Data
US 2023/0186375 A1 Jun. 15, 2023

(51) Int. Cl.
G06Q 30/00 (2023.01)
G06Q 10/087 (2023.01)
G06Q 30/0601 (2023.01)

(52) U.S. Cl.
CPC ....... G06Q 30/0643 (2013.01); G06Q 10/087 (2013.01)

(58) Field of Classification Search
CPC ...................................................... G06Q 30/00
See application file for complete search history.

(56) References Cited

U.S. PATENT DOCUMENTS

| | | | | |
|---|---|---|---|---|
| 6,026,376 A * | 2/2000 | Kenney | ............... | G06Q 30/0623 705/26.61 |
| 6,837,436 B2 * | 1/2005 | Swartz | .................. | G06Q 20/20 235/472.02 |
| 6,965,871 B1 * | 11/2005 | Szabo | ................ | G06Q 30/0603 705/26.8 |
| 7,685,023 B1 * | 3/2010 | Abraham | ........... | G06Q 30/0603 705/27.2 |
| 8,370,207 B2 * | 2/2013 | Edwards | ............ | G06Q 30/0201 705/26.1 |

(Continued)

FOREIGN PATENT DOCUMENTS

WO 2020199962 A1 10/2020

OTHER PUBLICATIONS

Buisman et al., Discounting and dynamic shelf life to reduce fresh food waste at retailers, International Journal of production Economics, dated Mar. 2019. (Year: 2019).*

(Continued)

*Primary Examiner* — Mark A Fadok
(74) *Attorney, Agent, or Firm* — Intelletek Law Group, PLLC; Gabriel Daniel, Esq.

(57) ABSTRACT

A computer implemented method for providing virtual reality shopping provides generating, by a virtual reality (VR) engine, a VR user interface (UI) and a VR session within a VR device. A list of discounted items being discounted based on proximity to an expiration or best by use date is received from the computing device of an institution item source. A VR image of virtual items on virtual shelves in the VR UI is displayed. The virtual items are dynamically displayed in different positions between a first VR session and a second VR session. Virtual representations of the discounted items being discounted are displayed in positions of priority on the virtual shelves, relative to other virtual items on the virtual shelves.

20 Claims, 6 Drawing Sheets

(56) References Cited

U.S. PATENT DOCUMENTS

| | | | |
|---|---|---|---|
| 10,037,561 B1* | 7/2018 | Hecht | G06Q 20/12 |
| 10,789,783 B2* | 9/2020 | Stansell | G06F 3/0482 |
| 11,094,002 B1 | 8/2021 | Allin et al. | |
| 2008/0043013 A1 | 2/2008 | Gruttadauria et al. | |
| 2008/0162262 A1 | 7/2008 | Perkins | |
| 2012/0330781 A1 | 12/2012 | Borrero | |
| 2013/0286048 A1* | 10/2013 | Sternitzke | G06F 16/487 |
| | | | 345/633 |
| 2013/0317950 A1 | 11/2013 | Abraham et al. | |
| 2015/0317667 A1* | 11/2015 | Wohlert | G06Q 30/0643 |
| | | | 705/14.35 |
| 2022/0351281 A1* | 11/2022 | Morgan | G06Q 30/0226 |

OTHER PUBLICATIONS

Metaverse | Walmart VR Virtual Shopping Experience SXSW; available at: https://www.youtube.com/watch?v=UNMHH0kIpPE&ab_channel=SteveRobin; uploaded May 31, 2022; transcription 5 pgs.

Mell, P. et al., "Recommendations of the National Institute of Standards and Technology"; NIST Special Publication 800-145 (2011); 7 pgs.

Disclosed Anonymously, "Personalized Virtual Shopping Environment"; IP.Com (2017); 3 pgs.

Disclosed Anonymously, "Method and System for Creation of Aggregated Commerce-Based Virtual Reality Shopping"; IP.Com (2020); 5 pgs.

Kelso, A., "Startup's Solution Lowers Prices on Food as Expiration Date Approaches"; Grocery Dive (2018); 3 pgs.

\* cited by examiner

DYNAMIC VIRTUAL REALITY SHOPPING SHELF INTERFACE

BACKGROUND

Technical Field

The present disclosure generally relates to data processing systems, and more particularly, to systems and methods for dynamic virtual reality shopping shelf interfaces.

Description of the Related Art

Conventional shopping stores provide dynamic pricing of shelf items based on "sell by," "use by," or "best if used by" dates. Some stores provide items at discounted rates when the items are near expiration or have passed "best if used by" dates.

In a physical store, the items are sometimes arranged to show which items are available at a discounted rate as an incentive to purchase. The consumer can physically move and select the items which are available at discounted rates.

Virtual Reality (VR) shopping environments can be completely different. Consumers generally have to navigate in the VR shopping environment to select the items. The items are arranged in a virtual reality shopping shelfs. Items for sale in a VR store do not generally provide expiration or use by dates for each item since the item is merely a representation of what is being purchased.

From a technology perspective, current VR systems only recognize requests for a type of item being purchased. The interaction of a consumer through the VR interface usually includes the user pointing to or grabbing the avatar or replicated likeness of an item from a shelf. A request is forwarded to a warehouse or similar storage room to grab a real-life version of the item from storage and pack it for shipping to the user. Since what the user selects is not the actual item, the aforementioned dates are generally unnecessary to show.

SUMMARY

According to an embodiment of the present disclosure, a computer implemented method is disclosed. The method provides generating, by a virtual reality (VR) engine, a VR user interface (UI) and a VR session within a VR device. A list of discounted items being discounted based on proximity to an expiration or best by use date is received from the computing device of an institution item source. A VR image of virtual items on virtual shelves in the VR UI is displayed. The virtual items are dynamically displayed in different positions between a first VR session and a second VR session. Virtual representations of the discounted items being discounted are displayed in positions of priority on the virtual shelves, relative to other virtual items on the virtual shelves.

In one embodiment, the method further provides accessing a smart container for a current inventory of real-life items in a user's possession. The current inventory is displayed to the user, in the VR UI. As will be appreciated, this feature automatically shows the user his or her current stock of items so that the user can consider what is currently in possession and what items may be missing or low in inventory. This avoids having to leave the VR environment to check or double-check, for example, the user's refrigerator or pantry to be assured of what to select from the VR storefront.

According to another embodiment of the present disclosure, a computer program product for providing virtual reality shopping includes one or more computer readable storage media, and program instructions collectively stored on the one or more computer readable storage media. The program instructions include generating, by a virtual reality (VR) engine, a VR user interface (UI) and a VR session within a VR device. A list of discounted items being discounted based on proximity to an expiration or best by use date is received from the computing device of an institution item source. A VR image of virtual items on virtual shelves in the VR UI is displayed. The virtual items are dynamically displayed in different positions between a first VR session and a second VR session. Virtual representations of the discounted items being discounted are displayed in positions of priority on the virtual shelves, relative to other virtual items on the virtual shelves, thereby providing a technical benefit of a more effective user interface.

Some embodiments include identifying the real-life items in the current inventory and expiration dates associated with each of the real-life items and displaying a suggestion of virtual items to acquire to replace the real-life items in the event the expiration dates are within a predetermined date from the VR session. This feature helps eliminate the omission of restocking items that may not be usable in the near future. It is easy for individuals to not see the expiration dates on items and assume that all items are readily available when in fact, they may have already expired or will be unusable by the time for consumption.

According to another embodiment of the present disclosure, a computer server for providing virtual reality shopping includes: a network connection; one or more computer readable storage media; a processor coupled to the network connection and coupled to the one or more computer readable storage media; and a computer program product including: program instructions collectively stored on the one or more computer readable storage media, the program instructions include generating, by a virtual reality (VR) engine, a VR user interface (UI) and a VR session within a VR device. A list of discounted items being discounted based on proximity to an expiration or best by use date is received from the computing device of an institution item source. A VR image of virtual items on virtual shelves in the VR UI is displayed. The virtual items are dynamically displayed in different positions between a first VR session and a second VR session. Virtual representations of the discounted items being discounted are displayed in positions of priority on the virtual shelves, relative to other virtual items on the virtual shelves.

In an embodiment, an A.I. module determines a historical rate of consumption for the real-life items in the current inventory. This feature may be used to suggest items for display in the VR UI so a user can consider acquiring the suggested items before the items run out in real life.

In general, aspects of the subject technology provide a technological advantage over traditional VR purchase interfaces. Conventional VR shopping shows items arranged in predetermined configurations of the VR designer's choosing. The subject technology may re-arrange items every session so that some items of higher priority are displayed more prominently and provide the user easier access to acquire. This technical benefit provided by the more advanced user interface eliminates the user having to wade through the different pages, virtual aisles, or similar in order to find items of impending need.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for a virtual reality storefront and virtual shelving generation. Generally, the user may be engaging in shopping through a computing device connected to a network. Within the electronic display of the computing device, software may provide a virtual reality user interface that generates virtual shelves of items. The content of items on the virtual shelves may be dynamically updated based on a user's consumption history and thew current item inventory in their home (or other location where food or products are being stored). In an illustrative embodiment, the items are perishable products that have expiration or best by use dates. The subject technology may in some embodiments, display items that are being discounted because of their associated proximity to an expiration, best by use, or other date associated with moving a product off a shelf, in a designated area (front of the shelf) or by a designated appearance (for example, tagged or highlighted). Some embodiments include a network that connects a smart container that holds a user's real inventory to a server coordinating the VR storefront items displayed on the shelves. Items displayed may be prioritized based on keeping inventory levels of some items up.

As will be understood, the subject disclosure provides among other things, an improvement to a user interface. The display of items in the user interface is dynamically arranged between sessions to shows some items more prominently than other so that users are presented with some items for easier identification and selection than others. It should be expected that this approach cannot be replicated manually since the features would require stores to re-arrange shelving arrangements and product placement every store visit by a customer and somehow present the shelves customized for each customer. Since stores do not traditionally service one customer at a time, such an approach is unreasonably characterized in any way as potential human behavior.

Example Architecture

Figure 1:
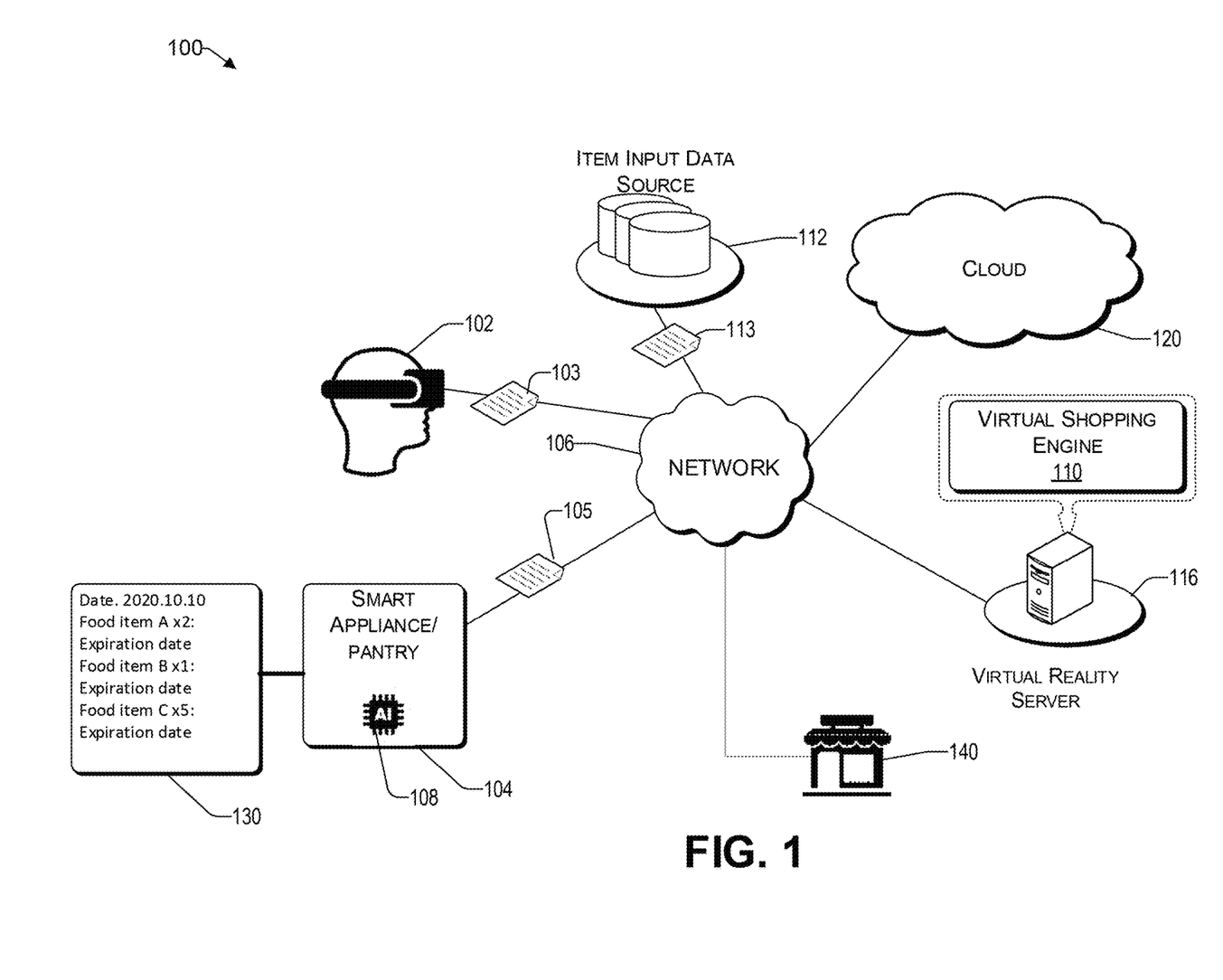
FIG. 1 is a block diagram of an architecture for a remote based virtual reality shopping system, according to an illustrative embodiment.

FIG. 1 illustrates an example architecture 100 for a VR shopping system. Architecture 100 includes a network 106 that allows a virtual reality device 102 to communicate with other elements that are connected to the network 106, such as an item input data source 112, a VR server 116, the cloud 120, and an institution 140. The virtual reality device 102 may be end user devices that are engaged in online selection and purchase of items. Items may be shown in a VR setting (described more fully below in FIG. 2) and represent real-life items for sale within the inventory of institution 140. Data file 103 may represent the items being selected by the user. Data files 113 may represent the identification of items and their associated information, available for selection. Some embodiments may include a smart container 104 (for example, a smart refrigerator or pantry) that includes a computing device (not shown). The smart container 104 may include an artificial intelligence (A.I.) module 108. The A.I. module 108 may track items by type currently in storage and the associated dates of each item. For example, the smart container 104 may include memory storing item information data 130 that includes items in stock by type, number of each item, and expiration or other date of each item The A.I. module 108 may calculate consumption rates of items in storage and may compare the current inventory levels to historical consumption. In some embodiments, the A.I. module 108 communicates inventory levels and consumption levels with the VR shopping engine 110 so that some items may be suggested or positioned prominently in the VR shopping interface. Data files 105 may represent the inventory and consumption data provided to the VR server 116. In an illustrative embodiment, the A.I. module 108 is able to track items and dates via RFID tags attached to each item in storage. The RFID tags may include item identification data and dates. Accordingly, the smart container 104 may include an item reader (not shown) that is able to read RFID information (or other types of identification, for example, code scanners) as is known in the art.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. In cloud based embodiments, resources may be gathered from different computing devices connected to the cloud network.

For purposes of later discussion, several user devices appear in the drawing, to represent some examples of the computing devices that may be the source of online shopping requests, and results. In an illustrative embodiment, users may interface with the architecture 100 through a VR platform, represented by VR computing device 102, which shows a user wearing a head worn VR device. While a head worn device is shown, it will be understood that other VR devices may operate similarly with the rest of the architecture 100. In some embodiments, a software application may provide a user interface (UI) through which the user may perform online shopping using aspects of the subject technology. Some embodiments may provide a virtual reality server 116 that provides a virtual shopping engine 110 that provides the API for online shopping. As will be shown in greater detail below, the VR computing device 102 may display an image through the online shopping API. The image may display virtual shelves and virtual items on the shelves. The user, seeing the image in VR computing device 102, may use pointing tools to select one or more items in the presented image. Examples of pointing tools include a virtual stylus, a virtual finger, virtual cursor, gesture controls, and gaze tracking.

While the item input data source 112 and the virtual shopping engine 110 are illustrated by way of example to be on different platforms, it will be understood that in various embodiments, the item input data source 112 and the virtual reality server 116 may be combined. In other embodiments, these computing platforms may be implemented by virtual computing devices in the form of virtual machines or software containers that are hosted in a cloud 120, thereby providing an elastic architecture for processing and storage.

Example Application

Figure 2:
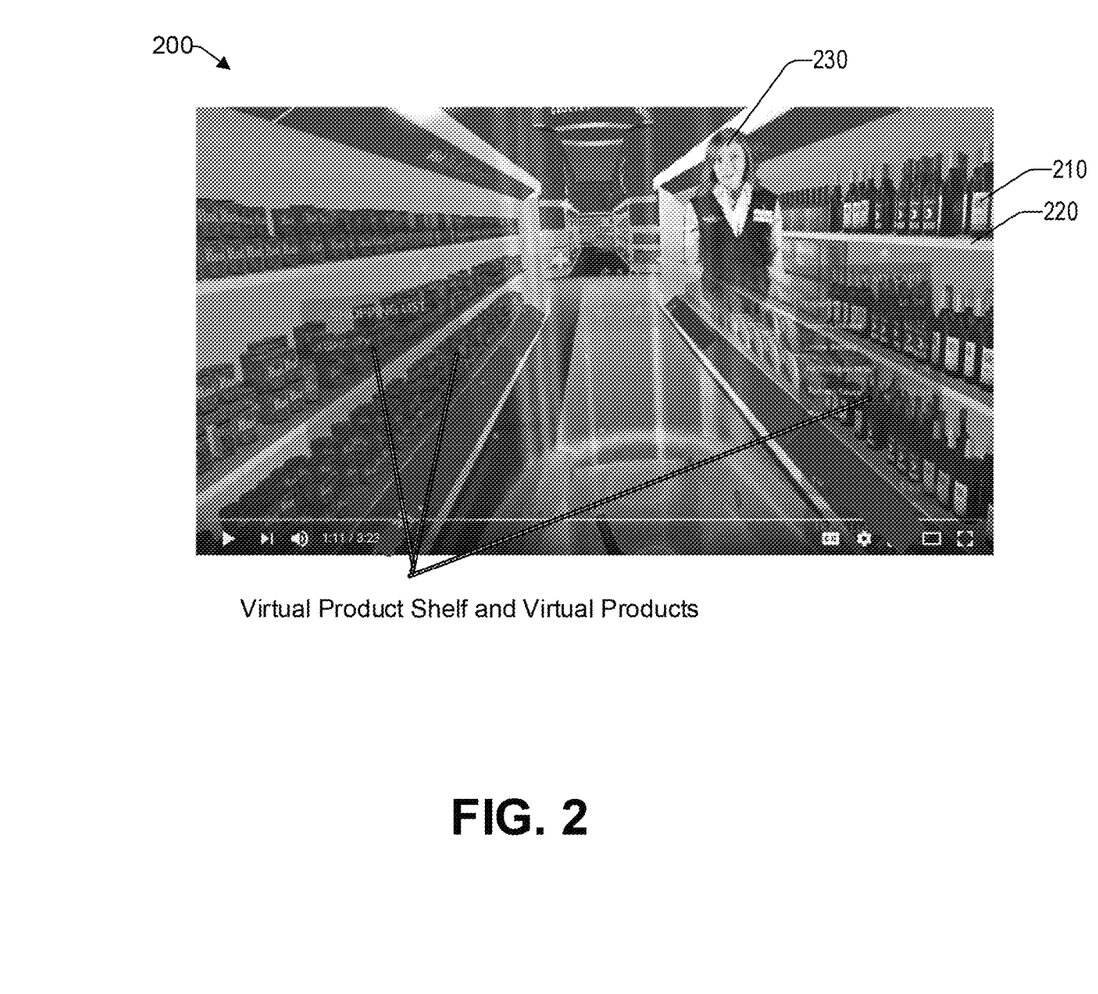
FIG. 2 is a screenshot of a virtual store interface, according to an illustrative embodiment.

Referring now to FIG. 2, an example of a virtual reality user interface 200, (sometimes referred to in abbreviation as the "VR UI 200") under the subject technology is shown by an illustrative embodiment. The virtual reality user interface 200 includes a display of virtual items 210 on a virtual store shelving system 220. In the virtual store shelving system 220, the items 210 shown may be organized according to groups of similar items by theme (for example, baking, canned vegetable, liquor, etc.,) or may be organized according to items of interest provided by user input. In an illustrative embodiment, the arrangement of 210 items on the virtual shelves 220 may be dynamic so that items are placed in different positions on triggering different VR sessions. In some embodiments, the items displayed may be based on need or suggestion as identified by the A.I. module 108 of FIG. 1. Some embodiments may include a virtual representative 230 that is available to assist the user with the virtual shopping experience.

In some embodiments, when consumers shop in the VR UI 200, the users may be provided information about the groceries currently possessed in storage and their expiration dates. Information from the smart container 104 (FIG. 1) may be displayed in the VR UI 200. When consumers use the VR UI 200 to shop, the VR UI 200 may display, for example, a virtual image of the food items currently in storage and their expiration date information.

In some embodiments, items in the selling institution's inventory that may be approaching an expiration or other date related to perishability may be displayed as being discounted. The VR server 116 may receive current inventory data from the selling institution 140 of items whose expiration or best by use dates are approaching and are discounted. As will be appreciated, this feature provides users an opportunity to acquire items at a best possible price. In one illustrative example, discounted items may be grouped together on a virtual shelf 220. In another example, the virtual shelf 220 or the items may be tagged or labeled as discounted. The items may be the same or different type items. In another embodiment, discounted items may be highlighted or positioned in front of non-discounted items on a same virtual shelf 220. The user may be provided information in the display of the VR UI 200 as to why the items are discounted. In the case that the items are discounted because of their proximity to an expiration or best by use date, the VR UI 200 may display the individual dates of each item being discounted so that the user may take into account potential consumption by the date listed. In some embodiments, the A.I. module 108 (FIG. 1) may provide a suggested probability of whether the item being considered for selection will be consumed before the attached date based on previous consumption history of the user.

Example Methodology

Figure 3:
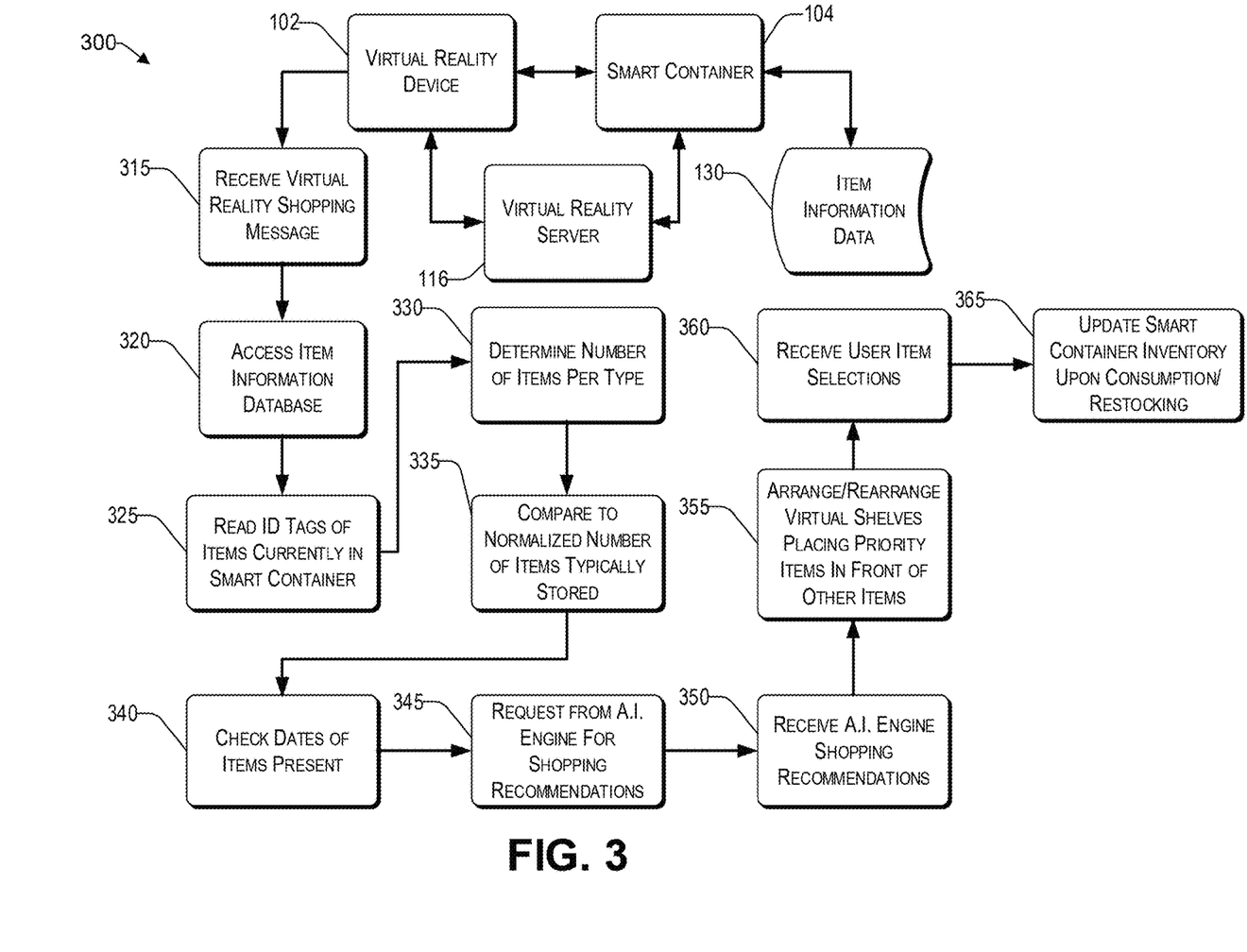
FIG. 3 is a flowchart of a method for providing a dynamic virtual reality environment, according to some embodiments.

Referring now to FIG. 3, a method 300 for providing virtual reality shopping environment is shown according to an illustrative embodiment. Generally, a computing device, (for example, a host platform computer server housing the virtual reality server 116), receives 315 a VR shopping request from a user's VR device 102. In some embodiments, the user may use an API that includes a general search query for an item(s) of interest. When the query is received 315 by the VR device 102, the VR server 116 may access 320 the current item information data 130 in the user's smart container 104. The A.I. module 108 (FIG. 1) may read 325 the ID tags of the items currently in the smart container 104. The A.I. module 108 or VR engine 110 may determine 330 the number of items currently in the user's possession by type. In some embodiments, the A.I. module 108 or VR engine 110 may compare the current inventory levels in the smart container 104 to normalized numbers of each item usually in stock to determine whether items are in need of being obtained. In some embodiments, the A.I. module 108 or VR engine 110 may check the dates of items in the smart container 104 to see if any are approaching expiration or being considered stale.

The VR engine 110 may request 345 from the A.I. module 108 recommendations based on current inventory in the smart container 104. The A.I. module 108 or VR engine 110 may recommend to the user through the VR device 102 acquiring replacements for items expiring or nearing expiration. In some embodiments, the A.I. module 108 or VR engine 110 may recommend acquiring items that may also likely be consumed soon based on historical consumption rates, leaving the inventory low. The VR device 102 may receive 350 the recommendations which are displayed to the user in the VR UI 200 (FIG. 2). The VR engine 110 may arrange 355 the virtual items for display in the VR UI 200. In some embodiments, some of the items displayed may be positioned based on a priority. For example, items that are nearing low inventory or expiration in the smart container 104 may be shown ahead of other items on the virtual shelves. Or, for example, items being discounted by the seller may be positioned in front of other non-discounted items or highlighted. The VR engine 110 may receive 360 the user's item selections. As items in the smart container 104 are consumed or re-stocked, the current item information data 130 is updated 365.

Example Computer Platform

Figure 4:
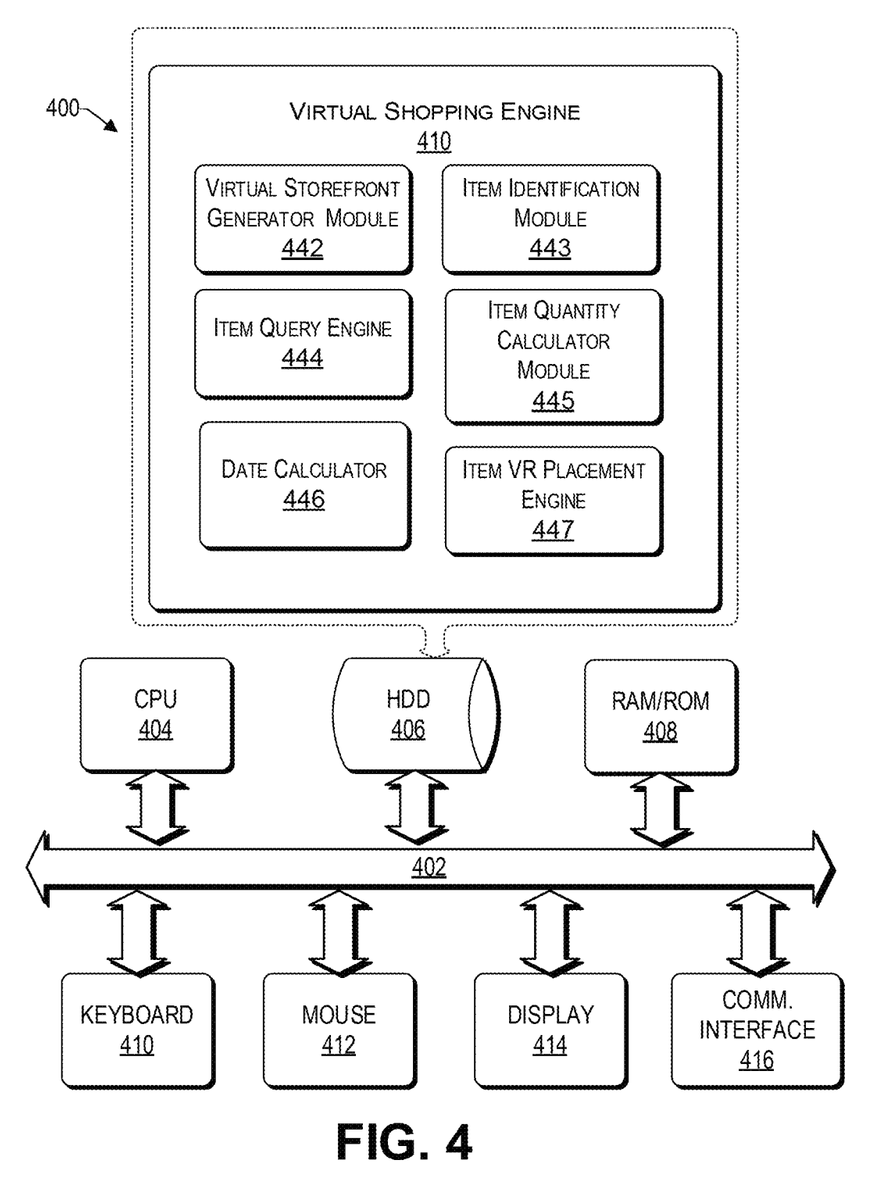
FIG. 4 is a functional block diagram illustration of a particularly configured computer hardware platform that can communicate with various networked components, consistent with an illustrative embodiment.

As discussed above, functions relating to online purchasing of the subject disclosure can be performed with the use of one or more computing devices connected for data communication via wireless or wired communication, as shown in FIG. 1. FIG. 4 is a functional block diagram illustration of a particularly configured computer hardware platform that can communicate with various networked components, such as the VR computing device 102, VR server 116, or the cloud 120, etc. In particular, FIG. 4 illustrates a network or host computer platform 400, as may be used to implement a server, such as the computing device 102(*n*) or VR server 116 of FIG. 1.

The computer platform 400 may include a central processing unit (CPU) 404, a hard disk drive (HDD) 406, random access memory (RAM) and/or read only memory (ROM) 408, a keyboard 410, a mouse 412, a display 414, and a communication interface 416, which are connected to a system bus 402.

In one embodiment, the HDD 406, has capabilities that include storing a program that can execute various processes, such as the virtual shopping engine 110, in a manner described herein. The virtual shopping engine 110 may have various modules configured to perform different functions. For example, the virtual shopping engine 110 may include the virtual storefront generator module 442, that generates the VR UI 200, an item identification module 443 that identifies items that are stored in the smart container 104 and/or a selling institution's inventory, the item query engine 444 that looks up items to be displayed, item quantity calculator module 445 that determines the number of each item currently in storage, the date calculator module 446 that determines the expiration/best buy date of items and calculates days from expiration (or need of replacement), and the item VR placement engine 447 that determines how to position items in the VR UI 200 and the priority of item placement.

Example Cloud Platform

As discussed above, functions relating to data processing using a machine learning model to discover new materials for application specific tasks (for example carbon dioxide separation), may include a cloud computing environment 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
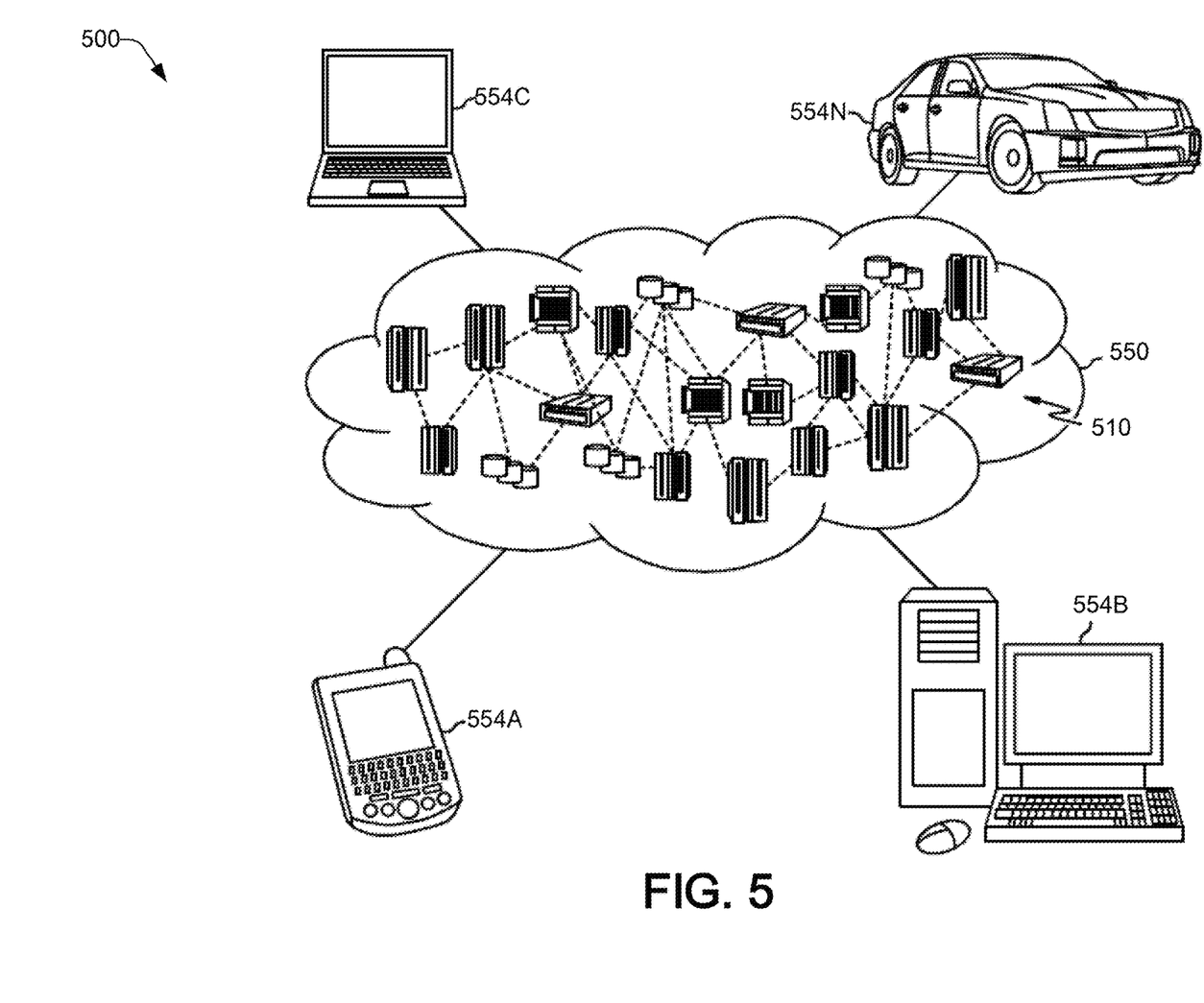
FIG. 5 depicts a cloud computing environment, consistent with an illustrative embodiment.

Referring now to FIG. 5, an illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
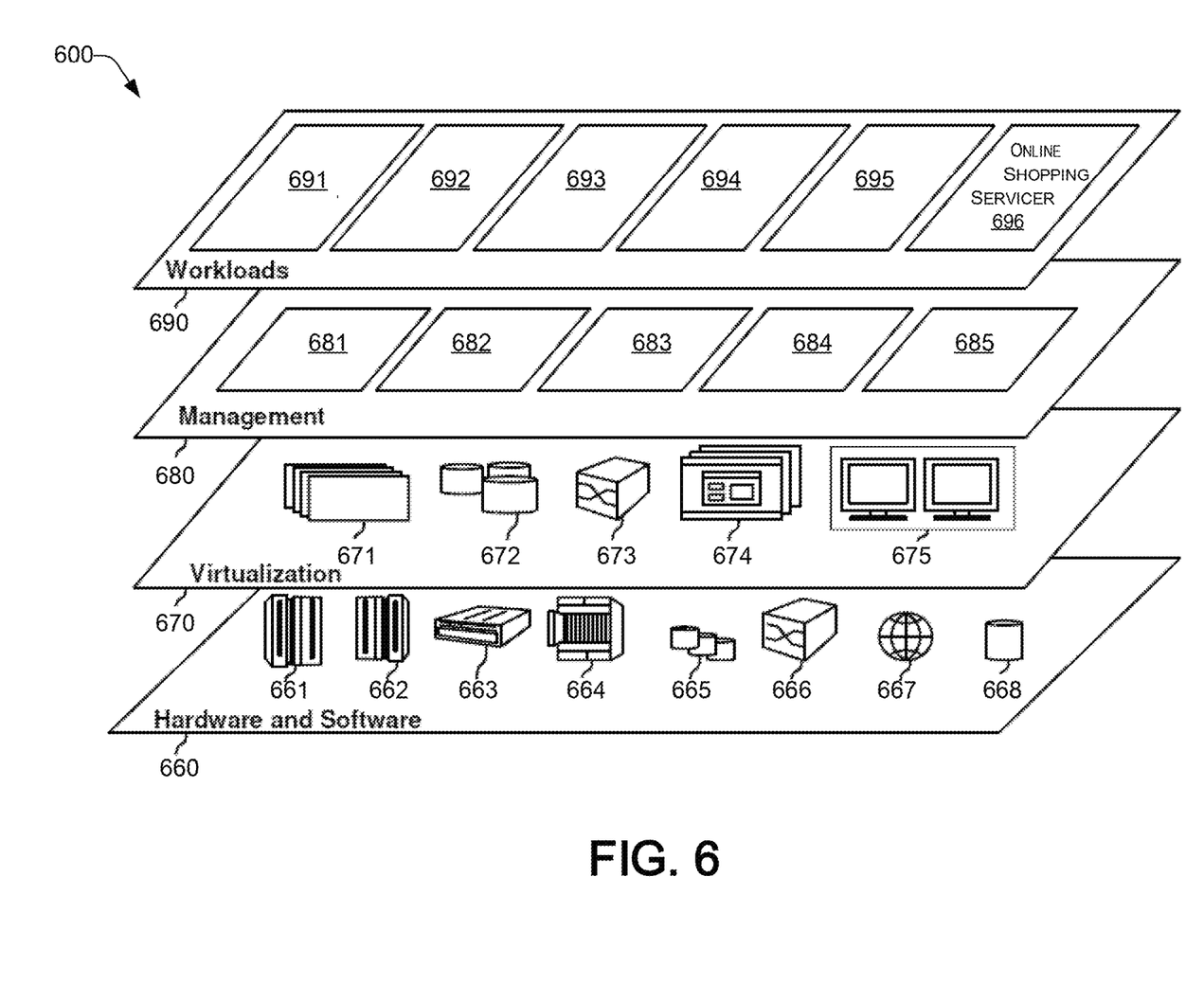
FIG. 6 depicts abstraction model layers, consistent with an illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and online shopping service administration 696, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method, comprising:
generating, by a virtual reality (VR) engine, a VR user interface (UI) and a VR session within a VR device;
receiving from a computing device of an institution item source, a list of discounted items being discounted based on a proximity to an expiration or a best by use date;
accessing a smart container for a current inventory of real-life items in a user's possession;
displaying a VR image of virtual items on virtual shelves in the VR UI, wherein the virtual items are dynamically displayed in different positions between a first VR session and a second VR session based on the proximity to an expiration and the current inventory of the real-life items in the user's possession, without a virtual replication of a physical store;
displaying virtual representations of the discounted items being discounted based on the proximity to the expiration or the best by use date and the current inventory of the real-life items in the user's possession, in positions of priority on the virtual shelves, relative to other virtual items on the virtual shelves; and
displaying the expiration or the best by use date for each item being discounted based on the proximity to the expiration or the best by use date in the virtual shelves in the VR UI.

2. The method of claim 1, further comprising displaying to the user, in the VR UI, the current inventory.

3. The method of claim 2, further comprising:
identifying the real-life items in the current inventory and expiration dates associated with each of the real-life items; and
displaying a suggestion of virtual items to acquire to replace the real-life items in an event the expiration dates are within a predetermined date from the VR session.

4. The method of claim 3, wherein the identification of items and expiration dates is performed by an artificial intelligence (A.I.) module in the smart container.

5. The method of claim 4, further comprising determining, by the A.I. module, a historical rate of consumption for the real-life items in the current inventory.

6. The method of claim 5, further comprising:
determining, by the A.I. module, an expected consumption rate of the real-life items in the current inventory;
providing to the VR engine, the expected consumption rate of the real-life items in the current inventory; and
determining by the A.I. module or by the VR engine, a list of recommended real-life items to purchase based on the expected consumption rate of the real-life items in the current inventory.

7. The method of claim 6, further comprising displaying, by the VR engine, virtual items on the virtual shelves representing the list of recommended real-life items to purchase.

8. A computer program product for providing virtual reality shopping, the computer program product comprising:

one or more non-transitory computer readable storage media, and program instructions collectively stored on the one or more computer readable storage media, the program instructions comprising:

generating, by a virtual reality (VR) engine, a VR user interface (UI) and a VR session within a VR device;

receiving from a computing device of an institution item source, a list of discounted items being discounted based on a proximity to an expiration or a best by use date;

accessing a smart container for a current inventory of real-life items in a user's possession;

displaying a VR image of virtual items on virtual shelves in the VR UI, wherein the virtual items are dynamically displayed in different positions between a first VR session and a second VR session based on the proximity to an expiration and the current inventory of the real-life items in the user's possession, without a virtual replication of a physical store;

displaying virtual representations of the discounted items being discounted based on the proximity to the expiration or the best by use date and the current inventory of the real-life items in the user's possession, in positions of priority on the virtual shelves, relative to other virtual items on the virtual shelves; and displaying the expiration or the best by use date for each item being discounted based on the proximity to the expiration or the best by use date in the virtual shelves in the VR UI.

9. The computer program product of claim 8, wherein the program instructions further comprise displaying to the user, in the VR UI, the current inventory.

10. The computer program product of claim 9, wherein the program instructions further comprise:
identifying the real-life items in the current inventory and expiration dates associated with each of the real-life items; and
displaying a suggestion of virtual items to acquire to replace the real-life items in an event the expiration dates are within a predetermined date from the VR session.

11. The computer program product of claim 10, wherein the identification of items and expiration dates is performed by an artificial intelligence (A.I.) module in the smart container.

12. The computer program product of claim 11, wherein the program instructions further comprise determining, by the A.I. module, a historical rate of consumption for the real-life items in the current inventory.

13. The computer program product of claim 12, wherein the program instructions further comprise:
determining, by the A.I. module, an expected consumption rate of the real-life items in the current inventory;
providing to the VR engine, the expected consumption rate of the real-life items in the current inventory; and
determining by the A.I. module or by the VR engine, a list of recommended real-life items to purchase based on the expected consumption rate of the real-life items in the current inventory.

14. The computer program product of claim 13, wherein the program instructions further comprise displaying, by the VR engine, virtual items on the virtual shelves representing the list of recommended real-life items to purchase.

15. A computer server for providing virtual reality shopping, comprising:
a network connection;
one or more non-transitory computer readable storage media;
a processor coupled to the network connection and coupled to the one or more computer readable storage media; and
a computer program product comprising program instructions collectively stored on the one or more computer readable storage media, the program instructions comprising:
generating, by a virtual reality (VR) engine, a VR user interface (UI) and a VR session within a VR device;
receiving from a computing device of an institution item source, a list of discounted items being discounted based on a proximity to an expiration or a best by use date;
accessing a smart container for a current inventory of real-life items in a user's possession;
displaying a VR image of virtual items on virtual shelves in the VR UI, wherein the virtual items are dynamically displayed in different positions between a first VR session and a second VR session based on the proximity to an expiration and the current inventory of the real-life items in the user's possession, without a virtual replication of a physical store;
displaying virtual representations of the discounted items being discounted based on the proximity to the expiration or the best by use date and the current inventory of the real-life items in the user's possession, in positions of priority on the virtual shelves, relative to other virtual items on the virtual shelves; and
displaying the expiration or the best by use date for each item being discounted based on the proximity to the expiration or the best by use date in the virtual shelves in the VR UI.

16. The computer server of claim 15, wherein the program instructions further comprise displaying to the user, in the VR UI, the current inventory.

17. The computer server of claim 16, wherein the program instructions further comprise:
identifying the real-life items in the current inventory and expiration dates associated with each of the real-life items; and
displaying a suggestion of virtual items to acquire to replace the real-life items in an event the expiration dates are within a predetermined date from the VR session.

18. The computer server of claim 17, wherein the identification of items and expiration dates is performed by an artificial intelligence (A.I.) module in the smart container.

19. The computer server of claim 18, wherein the program instructions further comprise determining, by the A.I. module, a historical rate of consumption for the real-life items in the current inventory.

20. The computer server of claim 19, wherein the program instructions further comprise:
determining, by the A.I. module, an expected consumption rate of the real-life items in the current inventory;
providing to the VR engine, the expected consumption rate of the real-life items in the current inventory;
determining by the A.I. module or by the VR engine, a list of recommended real-life items to purchase based on the expected consumption rate of the real-life items in the current inventory; and
displaying, by the VR engine, virtual items on the virtual shelves representing the list of recommended real-life items to purchase.

* * * * *